United States Patent
Kwoczek et al.

(10) Patent No.: US 10,464,571 B2
(45) Date of Patent: Nov. 5, 2019

(54) APPARATUS, VEHICLE, METHOD AND COMPUTER PROGRAM FOR COMPUTING AT LEAST ONE VIDEO SIGNAL OR CONTROL SIGNAL

(71) Applicant: VOLKSWAGEN AKTIENGESELLSCHAFT, Wolfsburg (DE)

(72) Inventors: Simon Kwoczek, Braunschweig (DE); Felix Richter, Hannover (DE); Julia Kwasny, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 4 days.

(21) Appl. No.: 15/747,241

(22) PCT Filed: Jul. 29, 2016

(86) PCT No.: PCT/EP2016/068197
§ 371 (c)(1),
(2) Date: Jan. 24, 2018

(87) PCT Pub. No.: WO2017/021318
PCT Pub. Date: Feb. 9, 2017

(65) Prior Publication Data
US 2019/0001992 A1    Jan. 3, 2019

(30) Foreign Application Priority Data
Jul. 31, 2015   (DE) .................. 10 2015 112 637

(51) Int. Cl.
*B60W 40/08*    (2012.01)
*B60W 40/10*    (2012.01)
(Continued)

(52) U.S. Cl.
CPC ............ *B60W 40/08* (2013.01); *B60W 40/10* (2013.01); *G08B 21/06* (2013.01); *B60R 1/00* (2013.01); *B60R 2300/70* (2013.01)

(58) Field of Classification Search
CPC ...... B60W 40/08; B60W 40/09; B60W 40/10; B60W 40/12; B60K 28/00; B60K 28/02;
(Continued)

(56) References Cited

U.S. PATENT DOCUMENTS

| 2007/0208492 | A1 | 9/2007 | Downs et al. |
| 2010/0030434 | A1* | 2/2010 | Okabe .................... A61B 5/165 |
| | | | 701/48 |

(Continued)

FOREIGN PATENT DOCUMENTS

| DE | 102005012984 A1 | 10/2006 |
| DE | 102005029444 A1 | 12/2006 |

(Continued)

OTHER PUBLICATIONS

Summons to Oral Proceedings for German Patent Application No. 10 2015 112 637.0; dated Mar. 7, 2018.

(Continued)

*Primary Examiner* — Van T Trieu
(74) *Attorney, Agent, or Firm* — Barnes & Thornburg LLP (57) ABSTRACT

An apparatus for a vehicle, a vehicle, a method, and a program having a program code. The apparatus has at least one input interface to receive sensor data from at least one sensor module, wherein the sensor data includes sensor information about a behavior of at least one occupant of the vehicle and/or about a travel situation of the vehicle. The apparatus has a control module to determine a potential need for information by the vehicle occupant based on the sensor information. The control module provides information cor- (Continued)

responding to the potential need for information and ascertains a representation of the information according to the potential need for information in the vehicle based on the sensor information. The apparatus has at least one output interface for providing at least one video signal or control signal according to the ascertained representation on one or more display devices.

14 Claims, 4 Drawing Sheets

(51) Int. Cl.
*G08B 21/06* (2006.01)
*B60R 1/00* (2006.01)

(58) Field of Classification Search
CPC ........ B60K 28/06; B60K 28/10; B60K 28/12; B60K 28/14; B60K 28/18; G08B 21/02; G08B 21/06; G06F 3/01; G06F 3/017; G05D 1/02; G05D 1/0276; G05D 1/12
See application file for complete search history.

(56) References Cited

U.S. PATENT DOCUMENTS

| | | | | |
|---|---|---|---|---|
| 2010/0090839 | A1* | 4/2010 | Omi | B60K 28/04 340/575 |
| 2011/0130951 | A1 | 6/2011 | Lee | |
| 2013/0035083 | A1* | 2/2013 | Kadel | H04W 84/005 455/418 |
| 2014/0114536 | A1* | 4/2014 | Kobana | B60K 28/06 701/49 |
| 2016/0033297 | A1* | 2/2016 | Konishi | G01C 21/3685 701/31.4 |
| 2018/0149489 | A1 | 5/2018 | Konishi et al. | |

FOREIGN PATENT DOCUMENTS

| | | |
|---|---|---|
| DE | 102006024615 A1 | 11/2007 |
| DE | 102008012816 A1 | 9/2009 |
| DE | 102008043755 A1 | 5/2010 |
| DE | 102010040818 A1 | 4/2011 |
| DE | 102012021111 A1 | 4/2014 |
| DE | 102013223684 A1 | 5/2015 |
| DE | 102014119653 A1 | 7/2015 |
| JP | 2008123448 A | 5/2008 |
| WO | 2014174677 A1 | 10/2014 |

OTHER PUBLICATIONS

Search Report for German Patent Application No. 10 2015 112 637.0, dated May 20, 2016.
Search Report for International Patent Application No. PCT/EP2016/068197, dated Oct. 13, 2016.

* cited by examiner

APPARATUS, VEHICLE, METHOD AND COMPUTER PROGRAM FOR COMPUTING AT LEAST ONE VIDEO SIGNAL OR CONTROL SIGNAL

PRIORITY CLAIM

This patent application is a U.S. National Phase of International Patent Application No. PCT/EP2016/068197, filed 29 Jul. 2016, which claims priority to German Patent Application No. 10 2015 112 637.0, filed 31 Jul. 2015, the disclosures of which are incorporated herein by reference in their entireties.

SUMMARY

Illustrative embodiments relate to an apparatus, a vehicle, a method, and a program having a program code.

BRIEF DESCRIPTION OF THE DRAWINGS

Disclosed embodiments are described in more detail in the following with reference to the drawings to which the embodiments are not restricted, however. What is illustrated is.

DETAILED DESCRIPTION

In modern vehicles, display devices often take on a key role. Frequently, many functions of the vehicle, like, e.g., a representation of information on the vehicle, a playback of media, providing map information or a representation of drive and location context information, are provided via display devices. Here, an intuitive representation of information frequently takes on an important role, as distractions and less intuitive representations may frequently affect the concentration of the driver and thus safe driving.

Modern vehicles frequently comprise more than one display device or apparatus: Apart from a display device of an information reproduction system, like, e.g., in the center console of the vehicle, a vehicle frequently includes further display devices, e.g., a combination display device which is arranged behind the steering wheel of the vehicle from the perspective of the driver, or projection-based display devices, e.g., so called head-up displays which may, for example, be projected into the field of view of the driver or another passenger.

Modern vehicles frequently comprise access to a mobile communication network and thus frequently access to a great amount of information which may be interesting for passengers of the vehicle. Here, frequently not all information is of the same relevance in all situations but depends on the current situation and the passengers of the vehicle.

There is a demand for providing a concept for a selection and representation of information on display devices which enables an improvement of the security and/or convenience of using a vehicle when utilizing display devices.

Some disclosed embodiments may enable this, for example, by determining a potential information need of the vehicle passengers based on the sensor data. One or several sensor modules may here, for example, detect sensor information based on a behavior of the passengers of the vehicle, for example, via a camera, an acoustic sensor or a motion sensor or a driving situation. Based on this performance or behavior, for example, a view in a certain direction or based on signs relating to tension, the potential information need may be determined and a way of representation for information as intuitive as possible according to the potential information need is to be determined. For example, to save transmission capacity, here only information may be requested which is currently needed based on the potential information need.

Disclosed embodiments provide a device for a vehicle. The device includes at least one input interface. The at least one input interface is configured for receiving sensor data from at least one sensor module. The sensor data include sensor information on a performance of at least one passenger of the vehicle and/or on a driving situation of the vehicle. The apparatus further comprises a control module. The control module is configured to determine a potential information need of the vehicle passenger based on the sensor information. The control module is further configured to provide information according to the potential information need. The control module is further configured to determine a way of representing the information according to the potential information need in the vehicle based on the sensor information. The device further includes at least one output interface for providing at least one video or control signal according to the determined way of representation to one or several display devices of the vehicle. Determining the potential information need and/or the way of representation may, for example, enable a more intuitive representation of information and increase the safety of the vehicle. By providing the information according to the potential information need, for example, a transmission capacity of information may be reduced.

In some disclosed embodiments, the control module may be configured to request and to receive the information according to the potential information need for providing information according to the potential information need. By requesting and receiving the information according to the potential information need, for example, a transmission capacity of information may be reduced.

In some disclosed embodiments, the control module may be configured to request and to receive the information according to the potential information need via a mobile radio interface. By requesting and receiving the information according to the potential information need, for example, a transmission capacity of information may be reduced, and, for example, costs for a transmission via the mobile radio network may be reduced.

In some disclosed embodiments, the control module may be configured to determine the way of representation based on two or more overlapping representation layers. The two or more overlapping representation layers may enable an overlaying of information according to the potential information need and basic information of the vehicle.

In some disclosed embodiments the sensor information may be based on at least one element of the group of visual sensor data, acoustic sensor data, position sensor data, acceleration sensor data, driving dynamics sensor data, body sensor data, ambient light sensor data, weather sensor data and vehicle sensor data. Utilizing such sensor data may enable detecting the behavior of the passenger and/or the driving situation.

In some disclosed embodiments, the information according to the potential information need may include at least one element of the group of information on the vehicle, information on a vehicle state of the vehicle, information on a position of the vehicle, information on locations in an environment of the vehicle, information on events in an environment of the vehicle, information on media of a media playback system of the vehicle and location data. The information according to the potential information need may, for example, be utilized to provide additional information to the at least one passenger in a current driving situation.

In some disclosed embodiments, the control module may be configured to adaptively adjust a detail degree of the information according to the potential information need based on the sensor information. By adapting the detail degree, driving safety may be increased in stressful situations.

In at least some disclosed embodiments, the control module may further be configured to receive vehicle-to-vehicle communication data. The control module may further be configured to determine the potential information need further based on the vehicle-to-vehicle communication data. The vehicle-to-vehicle communication may supplement the sensor information on the driving situation of the vehicle and may improve determining the potential information need.

In at least some disclosed embodiments, the control module may be configured to determine the potential information need based on a probability function based on the sensor information. Utilizing a probability function may enable utilizing experience values for determining the potential information need.

In at least some disclosed embodiments, the device may further include a memory module. The control module may be configured to determine a reaction of the at least one passenger to the way of representation based on the sensor data. The control module may be configured to store the reaction of the at least one passenger via the memory module. The control module may be configured to determine the way of representation further based on the stored reaction and an adaptive learning function. By an analysis of the reaction a prediction accuracy of the potential information need may be increased.

In some disclosed embodiments, the memory module may include at least a preference profile of the at least one passenger. The control module may be configured to determine the potential information need and/or the way of representation further based on the at least one preference profile. By the at least one preference profile a prediction accuracy of the potential information need may be increased.

In some disclosed embodiments, the control module may be configured to request or to receive the information according to the potential information need based on the at least one preference profile. By requesting and receiving the information according to the potential information need, specified by the at least one preference profile, for example, a transmission capacity of information may be reduced.

In at least some disclosed embodiments, the information according to the potential information need may include information on events in an environment of the vehicle. The control module may be configured to request or to receive the information on the events based on the at least one preference profile. Requesting the information on the events based on the preference profile may enable the events to be relevant for the at least one passenger. Further, for example, a transmission capacity of the information may be reduced.

In some disclosed embodiments, the at least one preference profile may include calendar information. The control module may be configured to request or to receive the information on the events based on the calendar information. Requesting the information on the events based on the calendar information may enable the events to be temporally relevant for the at least one passenger. Further, for example, a transmission capacity of the information may be reduced.

In some disclosed embodiments, the information on the events may include information on an availability of the events. The control module 14 may be configured to request or to receive the information on the events based on the availability. Requesting the information on the events based on the calendar information may enable the events to be available. Further, for example, a transmission capacity of the information may be reduced.

In some disclosed embodiments, the memory module may include location data. The control module may be configured to request or to receive the information on the events based on the location data. Requesting the information on the events based on the calendar information may enable the events to be reachable for the vehicle and/or to be reachable without detours. Further, for example, a transmission capacity of the information may be reduced.

Disclosed embodiments further provide a vehicle including the device and the one or more display devices. The device may be configured to provide at least one video or control signal to the one or more display devices. The one or more display devices may include at least one element of the group of information reproduction system, combination display system and projection-based display system. Utilizing the device may, for example, enable a more intuitive representation of information and increase the safety of the vehicle.

Disclosed embodiments further provide a method for a vehicle. The method comprises receiving sensor data from at least one sensor module. The sensor data include sensor information on a performance of at least one passenger of the vehicle and/or on a driving situation of the vehicle. The method further includes determining a potential information need of the vehicle passenger based on the sensor information. The method further includes providing information according to the potential information need. The method further includes determining a way of representing the information according to the potential information need in the vehicle based on the sensor information. The method further includes providing at least one video or control signal according to the determined way of representation to one or several display devices of the vehicle.

A further disclosed embodiment is a computer program for executing at least one of the above described methods when the computer program is executed on a computer, a processor or a programmable hardware component. A further disclosed embodiment is a digital storage medium which is machine or computer readable and comprises electronically readable control signals which may cooperate with a programmable hardware component so that one of the above described methods is executed.

Various disclosed embodiments will now be described with reference to the accompanying drawings in which some example embodiments are illustrated. In the figures, the thicknesses of lines, layers and/or regions may be exaggerated for clarity.

Like numbers refer to like or similar components throughout the following description of the included figures, which merely show some exemplary embodiments. Moreover, summarizing reference signs will be used for components and objects which occur several times in at least one disclosed embodiment or in at least one Figure but are described at the same time with respect to one or several features. Components and objects described with like or summarizing reference signs may be implemented alike or also differently, if applicable, with respect to one or more or all the features, e.g., their dimensioning, unless explicitly or implicitly stated otherwise in the description.

Although disclosed embodiments may be modified and changed in different ways, disclosed embodiments are illustrated as examples in the Figures and are described in detail herein. It is to be clarified, however, that is not the intent to restrict embodiments to the respectively disclosed forms but on the contrary, disclosed embodiments are to cover all functional and/or structural modifications, equivalents, and alternatives falling within the scope of the disclosure. Same reference numerals designate same or similar elements throughout the complete description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted similarly (e.g., "between" versus "directly between," "adjacent" versus "directly adjacent," etc.).

The terminology used herein is for the purpose of describing illustrative embodiments only and is not intended to be limiting the disclosed embodiments. As used herein, the singular forms "a," "an" and "the" are intended to include the plural forms as well, unless the context clearly indicates otherwise. It will be further understood that terms like, e.g., "comprises," "comprising," "includes" and/or "including," when used herein, specify the presence of stated features, integers, operations, elements and/or components, but do not preclude the presence or addition of one or more other features, integers, operations, elements, components and/or groups thereof.

Unless otherwise defined, all terms (including technical and scientific terms) used herein have the same meaning as commonly understood by one of ordinary skill in the art to which disclosed embodiments belong. It will be further understood that terms, e.g., those defined in commonly used dictionaries, may be interpreted as having a meaning that is consistent with their meaning in the context of the relevant art and will not be interpreted in an idealized or overly formal sense unless expressly so defined herein.

In times of continuous flow of information, there is more and more information which is potentially interesting and/or relevant, for example, for passengers of a vehicle. To prevent an information overload, it may be filtered meticulously which information is interesting for whom and when. Vehicles today theoretically can access any information in the world due to network connection. Showing the same to the correct user at the correct time may improve a display of those information and increase driving safety, as deflections are reduced, for example.

One example for such information is, for example, dynamic Points Of Interest, (POI), which may correspond to sights, shops and/or events in a map or navigation application. Conventional points of interest are based on a limited information basis, for example, are restricted to the terminal device on which they are searched and offer only a possibility of information display. Here, for example, always any available points of interest or detail degrees of information may be displayed although the same may not be relevant for the user in this situation.

Mobile phones frequently comprise a static display mechanism which frequently may not adjust to the current context (e.g., direction of view of the user). Additionally, conventional approaches frequently do not comprise mechanisms by which using swarm data possible subsequent decisions from recommendations may be registered and applied for further recommendations, for example, how many of the people to which the event was displayed actually take part in the event.

Figure 1:
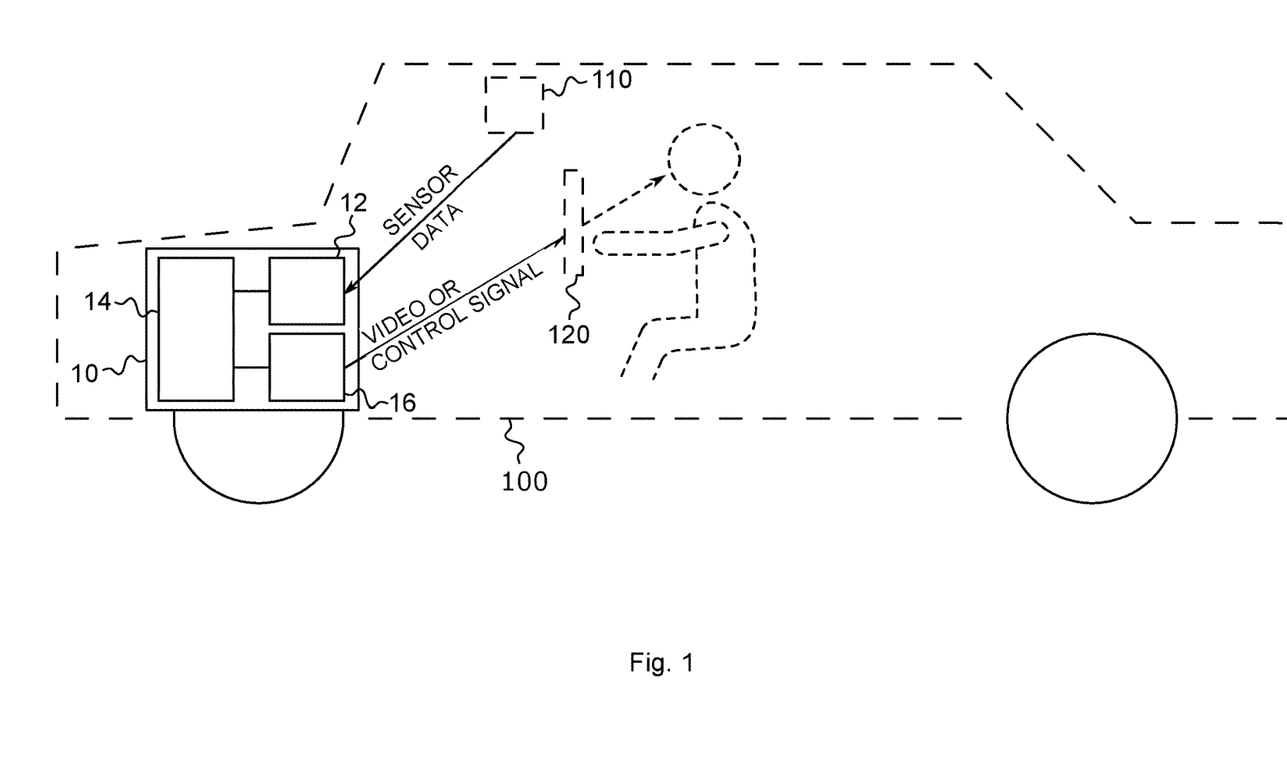
FIG. 1 shows a block diagram of an embodiment of a device for a vehicle.

FIG. 1 shows a block diagram of a disclosed embodiment of a device 10 for a vehicle 100. In at least some disclosed embodiments, the vehicle 100 may, for example, correspond to a land vehicle, a watercraft, an aerial vehicle, a rail vehicle, a road vehicle, an automobile, an off-road vehicle, a motor vehicle or a truck.

The device 10 includes at least one input interface 12. The at least one input interface 12 may, for example, correspond to one or more inputs for receiving information, e.g., in digital bit values, electrical signal, based on a code, within a module, between modules or between modules of different entities. The at least one interface 12 may, for example, correspond to an interface to a common data bus, for example, a Controller Area Network Bus, CAN-bus, and/or an interface to a common communication network, for example, a wireless and/or wire bonded network.

The input interface 12 is configured for receiving sensor data from at least one sensor module 110. The sensor data include sensor information on a behavior of at least one passenger of the vehicle 100 and/or on a driving situation of the vehicle 100.

The at least one sensor module 110 may, for example, comprise at least one element of the group of visual sensor, acoustic sensor, motion sensor, Time of Flight, ToF, sensor, biometric sensor (body sensor), acceleration sensor, position sensor, global positioning system, GPS, sensor, approximation sensor, weather sensor and temperature sensor. In some disclosed embodiments, the sensor information may be based on at least one element of the group of visual sensor data, acoustic sensor data, position sensor data, acceleration sensor data, driving dynamics sensor data, body sensor data, ambient light sensor data, weather sensor data and vehicle sensor data. In some disclosed embodiments, the at least one sensor module may comprise at least one sensor module outside the vehicle 100 and/or at least one sensor module inside the vehicle.

The sensor information on the behavior of the at least one passenger of the vehicle 100 may, for example, include video, image or motion sensor data which may, for example, be analyzed in a subsequent operation to detect a direction of view, facial expressions, gestures and/or tension of the at least one passenger. The sensor information on the behavior of the at least one passengers of the vehicle 100 may further, for example, comprise acoustic data which may, for example, be analyzed in a subsequent operation with respect to spoken words, expressions, singing etc., for example, by a control module 14 which will be introduced in the following. Data of an acceleration sensor, a position sensor, an approximation sensor, a weather sensor and/or a temperature sensor may, for example, be utilized to provide the sensor information on the driving situation of the vehicle 100, for example, to map a position of the vehicle 100 within a traffic infrastructure and with respect to other vehicles, like, e.g., in cognitively demanding operations like merging, turning, filtering and at difficult crossroads. The traffic infrastructure may, for example, include roads, paths, driveways, curves, bridges, tunnels, traffic lights, signs, crossroads, etc.

The device 10 further comprises a control module 14. In disclosed embodiments, the control module 14 may correspond to any controller or processor or a programmable hardware component. For example, the control module 14 may also be realized in software which is programmed for a corresponding hardware component. In so far, the control module 14 may be implementing as a programmable hardware with a correspondingly adapted software. Here, any processors, like digital signal processors (DSPs) may be used. Disclosed embodiments are not restricted to a certain type of processor here. Any processor or also several processors are possible for implementing the control module 14.

The control module 14 is configured to determine a potential information need of the vehicle passenger based on the sensor information.

In at least some disclosed embodiments, determining the potential information need may include an analysis of the sensor information. For analyzing the sensor information, the control module 14 may, for example, be configured to execute an analysis of the video, image, motion and/or time of flight sensor data, for example, to determine a direction of view, a pointing direction, facial expressions, gestures and/or state of tension. The control module 14 may, for example, be configured to execute a depth analysis based on the video and time of flight sensor data and to determine a three-dimensional image of the at least one passenger based on the depth analysis. Based on the three-dimensional image, the control module 14 may, for example, determine the direction of view and/or pointing direction of the at least one passenger. The control module 14 may further be configured to execute an image analysis of the image sensor date to determine a facial expression and/or gestures of the at least one passenger, for example, based on a face detection, a detection of parts of the face and the Facial Action Coding System (FACS). The control module 14 may further be configured to analyze acoustic sensor data, for example, by a volume analysis and/or via a speech content analysis. The control module 14 may further be configured to isolate coherent components of speech, for example, via an analysis of the relative speech pauses, and to provide the coherent components of speech to a speech analysis server and receive the spoken sentences or sentence meanings from the speech analysis server, for example, via a mobile communication network for speech content analysis.

In some disclosed embodiments, the control module 14 may further be configured to determine the driving situation based on the acceleration, driving dynamics, ambient light, weather and approximation sensor data, for example, relative to a traffic infrastructure and based on location data and position sensor data. The control module 14 may be configured to detect dangerous driving situations based on a pattern recognition, for example, based on a database with known sensor data associated to dangerous driving situations. The control module 14 may, for example, be configured to execute a uni- or multi-variant correlation analysis based on the sensor information and the known sensor data to determine the driving situation. The control module 14 may, for example, be configured to categorize the detected driving situation based on an attention which a driver of the vehicle needs in the driving situation.

The control module 14 may be configured to determine the potential information need of the at least one passenger based on the analyzed sensor information on the behavior of the at least one passenger and/or the driving situation. In at least some disclosed embodiments, the control module 14 may be configured to determine the potential information need based on a probability function based on the sensor information.

In at least some disclosed embodiments, the control module 14 may be configured to determine a detail degree of the potential information need based on the detected driving situation, for example, based on the categorization based on the required attention. The control module 14 may, for example, reduce a potential information need if a driving situation requires a higher attentiveness of the driver. The control module 14 may further be configured to determine the potential information need based on information which may be relevant for a driving situation, like, for example, navigation information or information on currently visible buildings and/or traffic infrastructure based on the current driving situation and/or position sensor and/or location data. The control module 14 may, for example, be configured to determine the potential information need consisting of location data, position sensor data and/or a driving direction of the vehicle, for example, a need of information on buildings and/or traffic infrastructure.

In at least some disclosed embodiments, the control module 14 may be configured to determine the potential information need based on the behavior of the at least one passenger. The control module 14 may, for example, be configured to determine the potential information need based on a direction of view and/or a pointing direction of the at least one passenger, for example, relative to one or more display devices 120, operating elements of the vehicle and/or relative to buildings and/or traffic infrastructure in an environment of the vehicle. The control module 14 may, for example, be configured to determine a potential information need with respect to buildings, traffic infrastructure, navigation information, operating elements and media information based on the direction of view and/or pointing direction. The control module 14 may further be configured to determine a potential information need regarding information on played media, like, e.g., music, for example, based on facial expression, gestures and/or singing of the at least one passenger. The control module 14 may, for example, be configured to determine a potential information need regarding song texts and/or further information on the song, for example, based on facial expression, gestures and/or singing of the at least one passenger. For example, rhythmic drumming of the at least one passenger may indicate potential interest in further information on the currently played song or the possibility of buying same.

The control module 14 is further configured to provide information according to the potential information need. The information according to the potential information need may include, for example, at least one element of the group of information on the vehicle 100, information on a vehicle state of the vehicle 100, information on a position of the vehicle 100, information on locations in an environment of the vehicle 100, information on events in an environment of the vehicle 100, information on media of a media playback system of the vehicle 100 and location data.

The control module 14 may, for example, be configured to request and to receive the information according to the potential information need for providing information according to the potential information need. The control module 14 may, for example, be configured to request and to receive the information according to the potential information need via a mobile radio interface. The mobile radio interface may, for example, correspond to an interface to a mobile communications network, for example, a Universal Mobile Telecommunication System (UMTS), Long Term Evolution (LTE) or LTE-Advanced (LTE-A), a 5th generation mobile communications network or an interface to a Wireless Local Area Network, WLAN.

In at least some disclosed embodiments, the control module 14 may be configured to base the information it requests on the potential information need, for example, to decrease a required transmission capacity. In some disclosed embodiments, the control module 14 may further be configured to determine and/or restrict the potential interest based on at least one preference profile of the at least one passenger and/or to request the information based on the at least one preference profile, for example, to reduce the required transmission capacity. A preference profile may here, for example, correspond to a collection of data including interests, preferences, coherences and/or previous decisions of the at least one passenger. A preference profile may, for example, include food preferences, interest in sports and music events, interest in sports and/or music groups and/or types and/or information on a desired detail degree of illustrated information. In some disclosed embodiments, the preference profile may further include information on reactions to representations on information.

In at least some disclosed embodiments, the information according to the potential information need may correspond to information which is currently relevant for the at least one passenger and which does not excessively affect the safety of the vehicle according to a need of attentiveness of the at least one passenger in the detected driving situation.

In some disclosed embodiments, the control module 14 further may be configured to adaptively adjust a detail degree of the information according to the potential information need based on the sensor information. The control module 14 may, for example, be configured to request the information according to the potential information need based on the adapted detail degree or the control module 14 may be configured to restrict already received information according to the potential information need for providing the information, for example, based on a full text analysis or based on structural features in the text, for example, metadata and/or tags.

The control module 14 is further configured to determine a way of representing the information according to the potential information need in the vehicle based on the sensor information. In at least some disclosed embodiments the way of representation may correspond to a distribution of a representation of the information according to the potential information need to the one or more display devices 120. The distribution may here, for example, correspond to an arrangement of the representation of the information according to the potential information need on a display device or an allocation of the representation of the information according to the potential information need on several display devices.

In at least some disclosed embodiments, the control module 14 may determine the way of representation, for example, based on a direction of view of the at least one passenger and/or based on the detected driving situation. For example, with a potential information need, the control module 14 may place the representation of the navigation instruction on a display device in the direction of view of the driver via a navigation instruction and/or the control module may, for example, represent information according to the potential information need regarding a building on a display device which is in the same direction of view as the building from the direction of view of the at least one passenger. In at least some disclosed embodiments, if several passengers are located within the vehicle, the control module 14 may be configured to place the representation of the information according to the potential information need on a display device in the direction of view of the passenger on whose behavior the potential interest is based.

In some disclosed embodiments, the control module 14 may be configured to determine the way of representation based on two or more overlapping representation layers. A representation layer may here, for example, correspond to a logic collection of representations which are displayed optically in parallel. If two representation layers overlap, the representation layer arranged logically above another representation layer may at least partially obscure the same. In some disclosed embodiments, representations of information may be represented in parallel on different representation layers, or the representation which is logically placed above the other may overlay the other. In at least some disclosed embodiments, the two or more overlapping levels or representation may be illustrated in a top-view, i.e., the representation layers overly each other completely, or the representation layers may, for example, be arranged in parallel to each other and on top of each other and be illustrated in a three-dimensional illustration. The two or more overlapping levels or representation may, for example, be illustrated on the same display device, wherein a representation layer may completely obscure a further representation layer (non-transparent representation layers) or supplement the same (representation layers with a transparent background). Display devices may, for example, be configured to illustrate one or more representation layers, for example, based on a video or control signal.

In at least some disclosed embodiments a representation layer of the two or more overlapping representation layers may include representations of basic information of the vehicle, for example, speed, acceleration, mileage and at least one further representation layer of the two or more overlapping representation layers may include information according to the potential information need. In at least some disclosed embodiments, the control module 14 may be configured to fade in and out the representation layers which include the representation of the information according to the potential information need based on the sensor information or to adjust a detail degree of the information according to the potential information need on these representation layers.

The device 10 further includes at least one output interface 16 for providing at least one video or control signal according to the determined way of representation to one or several display devices 120 of the vehicle 100. In at least some disclosed embodiments the control module 14 may be configured to compute the video or control signal based the way of representation and the information according to the potential information need and/or the representation layers. The video or control signal may, e.g., be an electronic, an optical or a radio signal. The output interface 16 may, for example, provide the video signal or the control signal in a format which may be processed by the respective display mechanism (e.g., the one or more display devices) for reproducing information (e.g., images). The output interface 16 may, for example, correspond to one or more outputs for transmitting information, e.g., in digital bit values, electrical signals, based on a code, within a module, between modules or between modules of different entities. The control module is coupled to the at least one input interface 12 and to the output interface 16. The one or more display devices 120 may include at least one element of group of information reproduction system, combination display system and projection-based display system.

In at least some disclosed embodiments, the control module 14 may further be configured to receive vehicle-to-vehicle communication data. The control module 14 may be configured to determine the potential information need further based on the vehicle-to-vehicle communication data. In at least some disclosed embodiments, the vehicle-to-vehicle communication may include information on a traffic development, for example, information on an accident and/or traffic jam, and the control module 14 may be configured to base the potential information need further on the information on traffic development.

Figure 2:
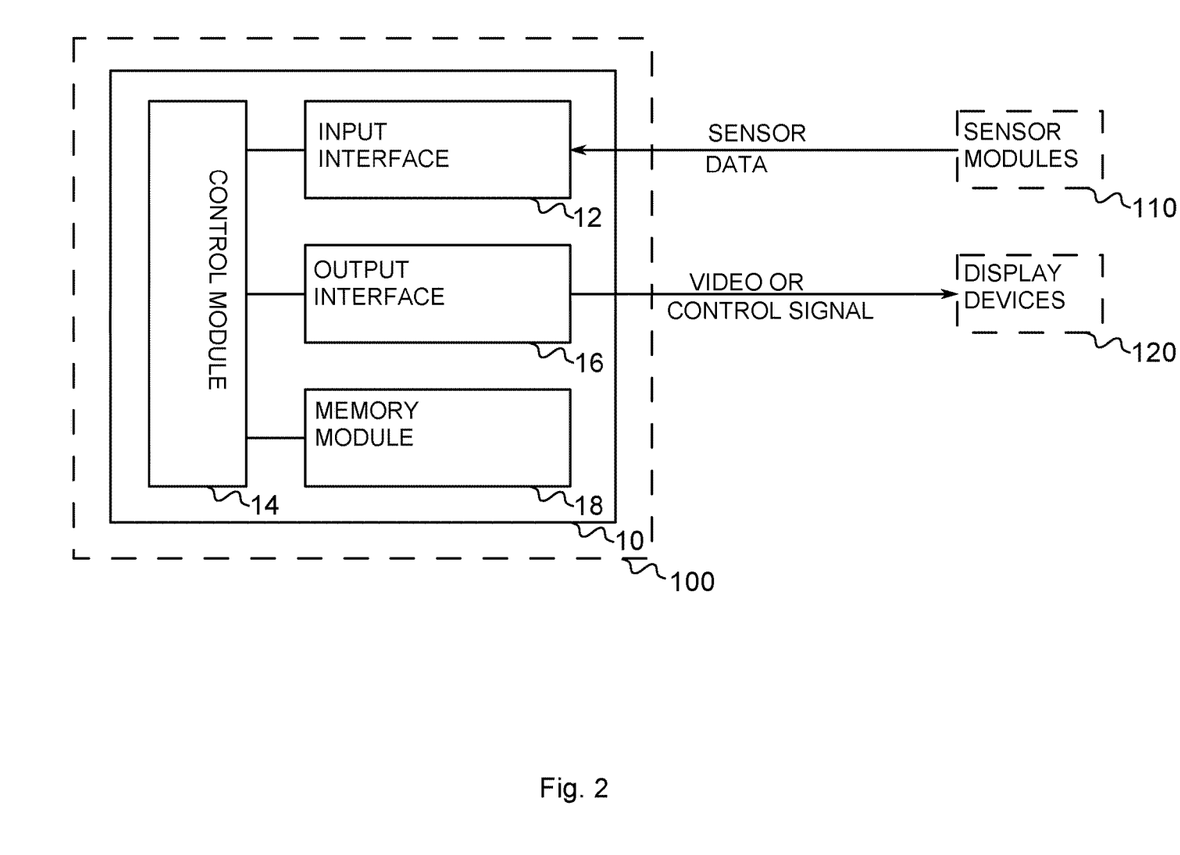
FIG. 2 shows a block diagram of an embodiment of a device for a vehicle, the device further including a memory module.

FIG. 2 shows a block diagram of a disclosed embodiment of the device 10 for the vehicle 100, the device 10 further including a memory module 18. The device 10 further includes the at least one input interface 12, the control module 14 and the output interface 16. The control module 14 is coupled to the at least one input interface 12, the output interface 16 and the memory module 18. The at least one input interface is configured to receive sensor data from the at least one sensor module 110, and the output interface 16 is configured to provide the video or control signal to the one or more display devices 120.

In some disclosed embodiments, the memory module 16 may, for example, include at least one element of the group of a computer-readable storage medium, for example, a magnetic or optical storage medium, for example, a main disk, a flash memory, a floppy disk, Random Access Memory, RAM, Programmable Read Only Memory, PROM, Erasable Programmable Read Only Memory, EPROM, an Electronically Erasable Programmable Read Only Memory, EEPROM, and network storage.

The control module 14 may be configured to determine a reaction of the at least one passenger to the way of representation based on the sensor data and store same via the memory module 18. The control module 14 may be configured to determine the way of representation based on the stored reaction and an adaptive learning function. In at least some disclosed embodiments, the reaction may, for example, include a manual correction of the way of representation and/or the behavior of the at least one passenger, for example, a tension of the at least one passenger. The control module 14 may, for example, be configured to compare the reaction by pattern recognition to a group of known reactions to categorize and evaluate the reaction.

In at least some disclosed embodiments, the memory module 18 may include the preference profile of the at least one passenger. The control module 14 may be configured to determine the potential information need and/or the way of representation further based on the at least one preference profile. In some disclosed embodiments, the control module may be configured to request and/or to receive the information according to the potential information need based on the at least one preference profile. The control module 14 may, for example, be configured to generate and/or adapt the preference profile based on the reaction.

In at least one exemplary embodiment, the information according to the potential information need may include information on events in an environment of the vehicle. The control module 14 may be configured to request or to receive the information on the events based on the at least one preference profile.

In at least some disclosed embodiments, the information according to the potential interest may be based on a database on local events (concerts, sports events, etc.), restaurants, clubs, etc. in which, for example, detailed information may exist (when an event takes place, where it takes place, how many free tables there are left in a restaurant, etc. . . . ). This information may, for example, come from the internet, data collected by vehicle-to-vehicle communication or from vehicle data themselves.

This database may, for example, be queried using the preference profile which may include detailed user information. This user information may, for example, include preferences of a user (what music he listens to, what food he likes), his current timetable (if he is on his way to work or starting into the weekend? Is he meeting a friend or driving to see his parents?), or his favorite sports club. Based on the preference profile known (or detected) events may be selected and the control module 14 may be configured to receive this information according to the potential interest.

In at least some disclosed embodiments, the at least one preference profile may include calendar information. The control module 14 may be configured to request or to receive the information on the events based on the calendar information.

The information on the events may include information on an availability of the events. The control module 14 may be configured to request or to receive the information on the events based on the availability. In some disclosed embodiments, the memory module 18 may include location data and the control module 14 may be configured to request or to receive the information on the events based on the location data. Location data may, for example, be map data, information on buildings, shops, restaurants and/or information on route restrictions.

Based on the location data the events may, for example, be filtered, for example, based on the distance, the vehicle state (is the detour worthwhile or would he have to make an even bigger detour to find a petrol station? Is the vehicle able to drive off-road using its current tires?), is the vehicle allowed to drive into the city center (e.g., due to requested emissions stickers), what is the traffic like at the moment and what will it be like in the future.

The control module 14 may further be configured to request the information on the events based on the preference profile and filter same, e.g., based on a popularity of the events or limit the same during the request (if it is not his personal favorite band, for example). Here, for example, information from social media may be used which allow conclusions regarding the popularity of the event (number of fans on twitter) and the target group of the event. This way, for example, less popular events or events of a different target group may be filtered out a priori.

The control module 14 may be configured to determine the preference profile and the vehicle status on the basis of the data available in the vehicle, information from other vehicles on vehicle-to-vehicle- or vehicle-to-infrastructure communication and the supplementation of this data on the internet by information of other providers like FACEBOOK®, construction site offices, weather providers, etc.) The preference profile of the at least one passenger may be known, and thus his interest in certain event categories. If he is nearby and/or if a high probability may be deducted that he will spontaneously decide to take part in the event which is soon taking place (vehicle status, sufficient range, no time pressure (calendar information), financial situation, mood (sensor information on behavior), weather situation for event location outdoor etc.) information on the event may be displayed to the at least one passenger (event information, beginning, end, location, popularity level, availability of tickets).

In some disclosed embodiments it may centrally be known, how many other drivers there are who are in a similar situation and might also decide spontaneously to drive to the event. The information on the events may, for example, include how high the chances are to get one of the tickets which are still available. This may, for example, be computed based on currently available tickets, the number of drivers who may spontaneously be interested and the level of popularity.

In case drivers currently want to sell tickets, selling drivers and the closest buying driver may be navigated towards each other via navigation so that they can meet at a certain point for exchanging tickets.

Figure 3:
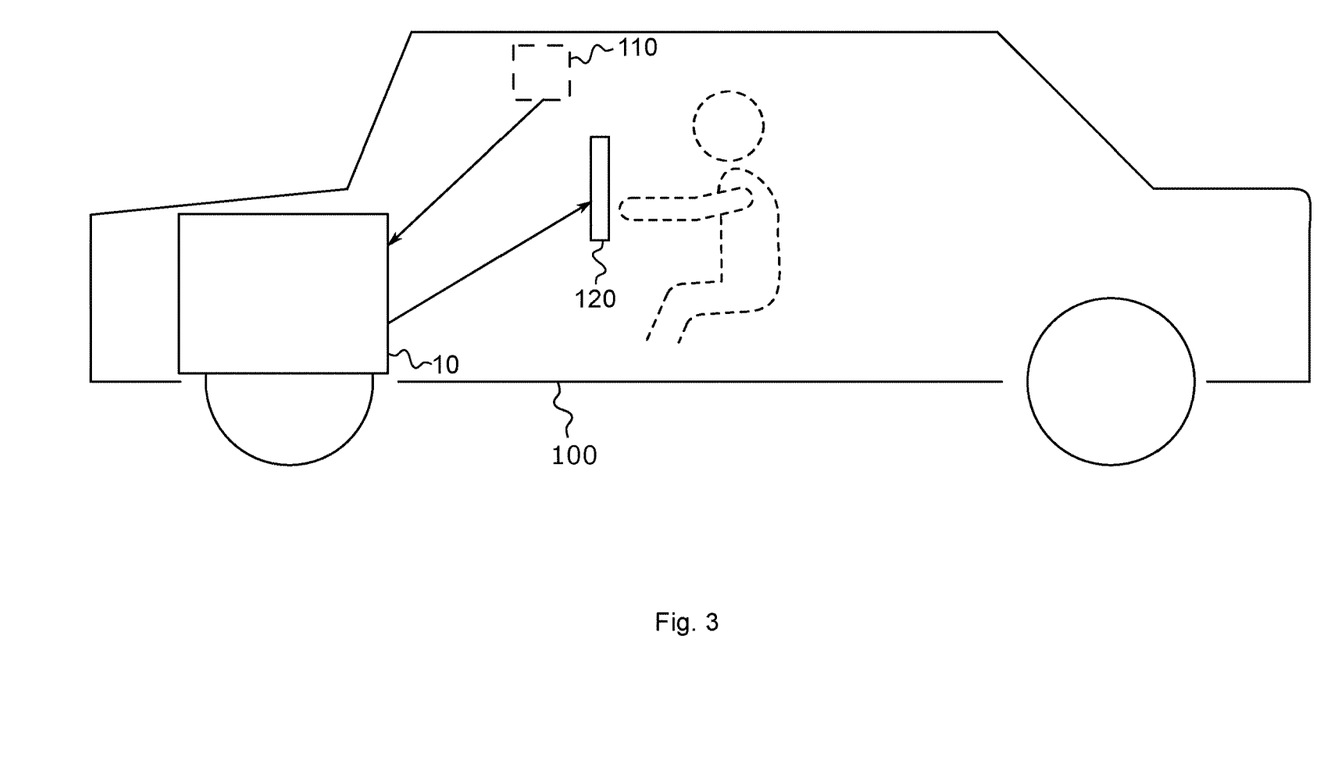
FIG. 3 shows a block diagram of an embodiment of a vehicle including a device for a vehicle and one or more display devices.

FIG. 3 shows a block diagram of a disclosed embodiment of a vehicle 100 including the device 10 and the one or more display devices 120. The device 10 is configured to provide at least one video or control signal to the one or more display devices 120. Optionally, the vehicle 100 further includes the at least one sensor module 110. The one or more display devices 120 may include at least one element of the group of information reproduction system, combination display system and projection-based display system, Thin Film Transistor screen (TFT), a touch screen or a head-up display arranged in the center console of the vehicle or behind the steering wheel of the vehicle in the area of the dashboard from the perspective of the driver.

The information reproduction system which may, for example, be included in the center console of the vehicle, may be configured to indicate the video or control signal provided by the output interface 16. The information according to the potential interest may, for example, be represented as a new representation layer in the representation layers based in the information reproduction system.

Regarding the detail degree the combination display system is different from the information reproduction system, thus, for example, the information according to the potential interest may be indicated with a different detail degree.

The head-up display may be between the combination display system and the information reproduction system regarding the detail degree. The information related to the potential interest may be projected into the field of view of the driver. As far as the eyes of the driver are directed in driving direction, the representation of information according to the potential interest on the information reproduction system may be beneficial when driving with front passengers. For example, in this case, the representation of information may be focused on the head-up display and the information reproduction system may only indicate basic information.

A further possibility may be a colored projection onto the road ahead of the vehicle. There, for example, information according to the potential interest may be indicated to the driver with a lower detail degree.

Figure 4:
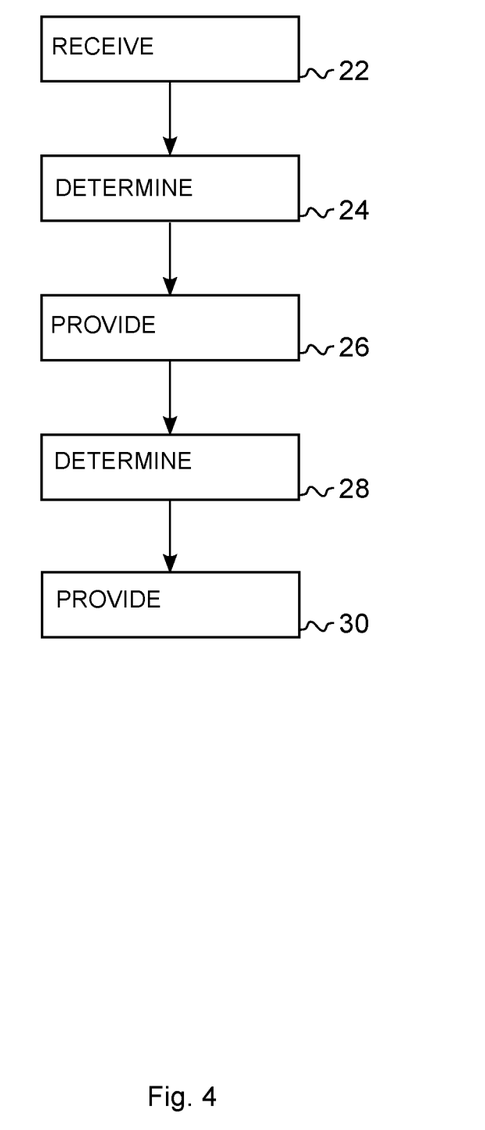
FIG. 4 shows a block diagram of an embodiment of a method for a vehicle.

FIG. 4 shows a flow chart of a disclosed embodiment of a method for a vehicle 100. The method comprises receiving 22 sensor data from at least one sensor module 110, wherein the sensor data include sensor information on a behavior of at least one passenger of the vehicle 100 and/or on a driving situation of the vehicle 100. The method further includes determining 24 a potential information need of the vehicle passenger based on the sensor information. The method further includes providing 26 information according to the potential information need. The method further includes determining 28 a way of representing the information according to the potential information need in the vehicle based on the sensor information. The method further includes providing 30 at least one video or control signal according to the determined way of representation to one or several display devices 120 of the vehicle.

A further disclosed embodiment is a computer program for executing at least one of the above described methods when the computer program is executed on a computer, a processor or a programmable hardware component. A further disclosed embodiment is a digital storage medium which is machine or computer readable and comprises electronically readable control signals which may cooperate with a programmable hardware component so that one of the above described methods is executed.

Features disclosed in the above description, the following claims and the included figures may both individually and also in any combination be implemented and of importance for the realization of an embodiment in different implementations.

Although some embodiments were described in connection with a device, it is obvious that these objects may also represent a description of a corresponding method, so that a block or a member of a device may also be regarded as a corresponding method operation or as a feature of a method operation. Analogously, embodiments described in the context of or as a method operation also represent a description of a corresponding block or detail or feature of a corresponding device.

Disclosed embodiments may, for example, provide a context-dependent information filtering, information selection and way of representation. In some disclosed embodiments, the way of representation on the representation layer may integrate the information according to the potential interest into known contexts (no newly computed representation is required but representation layers including the changes may be sufficient).

In at least some disclosed embodiments a learning algorithm may decide, for example, within the control module 14, what information is displayed to a user (considering any known persons also sitting in the vehicle) when (is he in a dangerous driving situation at the moment?) and where. Here, the control module 14 may adaptively react to the situation of the driver and limit the flood if information, possibly without any information loss.

Depending on certain implementation requirements, disclosed embodiments may be implemented in hardware or in software. The implementation may be executed using a digital storage medium, for example, a floppy disk, a DVD, a blue ray disc, a CD, an ROM, a PROM, an EPROM, an EEPROM or a flash memory, a hard disk or another magnetic or optical memory on which electronically readable control signals are stored which may or do cooperate with a programmable hardware component such that the respective method is executed.

A programmable hardware component may be formed by a processor, a computer processor (central processing unit), a graphics processing unit (GPU), a computer, a computer system, an application specific integrated circuit ASIC), an integrated circuit (IC), a system on chip (SOC), a programmable logics element or a field programmable gate array (FPGA) comprising a micro-processor.

The digital storage medium may be machine or computer readable. Some disclosed embodiments include a data carrier which comprises electronically readable control signals which are able to cooperate with a programmable computer system or a programmable hardware component such that one of the methods described herein is executed. A disclosed embodiment thus is a data carrier (or a digital storage medium or a computer readable medium) on which the program for executing one of the methods described herein is recorded.

Generally speaking, disclosed embodiments may be implemented as a program, firmware, a computer program or computer program product having a program code or as data, wherein the program code or the data is or may be operable to execute one of the methods, when the program is executed on a processor or a programmable hardware component. The program code or the data may, for example, be stored on a machine readable carrier or data carrier. The program code or the data may, among others, be present as a source code, machine code or byte code or any other intermediate code.

A further disclosed embodiment is a data stream, a signal sequence or a sequence of signals which represent the program for executing one of the methods described herein. The data stream, the signal sequence or the sequence of signals may, for example, be configured such as to be transferred via a data communications connection, like, e.g., via the internet or any other network. Disclosed embodiments consequently also are data-representing signal sequences suitable for being transmitted via a network or a data communications connection, wherein the data represents the program.

A program according to at least one disclosed embodiment may, for example, implement one of the methods during its execution by reading out memory locations or writing one or several data into the same, whereby possibly switching processes or other processes in transistor structures, in amplifier structures or in other electrical, optical, magnetic or other components operating according to another functional principle are caused. Accordingly, by reading out a memory location, data, values, sensor values or other information may be detected, determined or measured by a program. By reading out one or several memory locations a program may thus detect, determine or measure quantities, values, measured quantities and other information and cause, initiate or execute an action by writing into one or several memory locations and control other devices, machines and components.

The above described embodiments merely represent an illustration of the principles of the present disclosure. It is obvious that modifications and variations of the arrangements and details described herein are obvious for other persons skilled in the art. It is intended that the disclosure is only limited by the scope of the following claims and not by the specific details which were presented herein using the description and the explanation of the disclosed embodiments.

REFERENCE NUMERALS 10 device
12 at least one input interface
14 control module
16 output interface
18 memory module
22 receiving
24 determining
26 providing
28 determining
30 providing
100 vehicle
110 at least one sensor module
120 one or more display devices

The invention claimed is:

1. A device for a transportation vehicle, the device comprising:
a plurality of sensor modules, the plurality of sensor modules including at least one sensor module for sensing sensor data that indicates a behavior of at least one passenger of the transportation vehicle in an interior of the transportation vehicle by detecting image data or audio data within the interior of the transportation vehicle, and at least one sensor module for sensing sensor data that indicates a driving situation of the transportation vehicle;
at least one input interface to receive the sensor data from the plurality of sensor modules;
a control module coupled to the at least one input interface and configured to:
determine the behavior of the at least one passenger of the vehicle based on the sensor data collected within the transportation vehicle interior indicating at least one of physical movement, facial expressions, and speech of the at least one passenger within the transportation vehicle interior,
determine the driving situation of the vehicle based on the sensor data indicating performance of transportation vehicle and an environment condition surrounding the transportation vehicle,
determine a potential information need of the at least one vehicle passenger based on the sensor data received from the plurality of sensor modules via the at least one input interface,
identify information based on the potential information need, and
determine a way of presenting the identified information according to the potential information need in the transportation vehicle based on the sensor data received from the plurality of sensor modules via the at least one input interface; and
at least one output interface that provides at least one video or control signal according to the determined way of presenting the identified information to at least one display device included in the transportation vehicle.

2. The device of claim 1, wherein the control module provides information according to the potential information need, requests and receives the information according to the potential information need.

3. The device of claim 2, wherein the control module requests and receives the information according to the potential information need via a mobile radio interface.

4. The device of claim 1, wherein the control module determines the way of representation based on two or more overlapping representation layers.

5. The device of claim 1, wherein the sensor data is based on at least one element of the group of visual sensor data, acoustic sensor data, position sensor data, acceleration sensor data, driving dynamics sensor data, body sensor data, ambient light sensor data, weather sensor data and vehicle sensor data, or wherein the information according to the potential information need includes at least one element of the group of information about the vehicle, information about a vehicle state of the vehicle, information about a position of the vehicle, information on locations in an environment of the vehicle, information about events in an environment of the vehicle, information about media of a media playback system of the vehicle and location data, or wherein the control module adaptively adjusts a detail degree of the information according to the potential information need based on the sensor data.

6. The device of claim 1, wherein the control module further receives vehicle-to-vehicle communication data and wherein the control module determines the potential information need further based on the vehicle-to-vehicle communication data, or wherein the control module determines the potential information need based on a probability function based on the sensor data.

7. The device of claim 1, further comprising a memory module, wherein the control module determines a reaction of the at least one passenger to the way of representation based on the sensor data and stores the same via the memory module, and wherein the control module further determines the way of representation based on the stored reaction and an adaptive learning function, or wherein the memory module includes at least one preference profile of the at least one passenger and wherein the control module determines the potential information need and/or the way of representation further based on the at least one preference profile.

8. The device of claim 1, wherein the plurality of sensor modules includes at least one of a camera, an acoustic sensor, a video sensor, an image sensor, and a motion sensor.

9. A transportation vehicle, comprising:
one or more display devices comprising at least one element of the group consisting of information reproduction system, combination display system and projection-based display system; and
a device, the device comprising:
a plurality of sensor modules, the plurality of sensor modules including at least one sensor module for sensing sensor data that indicates a behavior of at least one passenger of the transportation vehicle in an interior of the transportation vehicle by detecting image data or audio data within the interior of the transportation vehicle, and at least one sensor module for sensing sensor data that indicates a driving situation of the transportation vehicle;
at least one input interface to receive the sensor data from the plurality of sensor modules;
a control module coupled to the at least one input interface and configured to:
determine the behavior of the at least one passenger of the vehicle based on the sensor data collected within the transportation vehicle interior indicating at least one of physical movement, facial expressions, and speech of the at least one passenger within the transportation vehicle interior,
determine the driving situation of the vehicle based on the sensor data indicating performance of transportation vehicle and an environment condition surrounding the transportation vehicle,
determine a potential information need of the vehicle passenger based on the sensor data received from the plurality of sensor modules via the at least one input interface,
identify information according to the potential information need, and
determine a way of presenting the identified information according to the potential information need in the transportation vehicle based on the sensor data received from the plurality of sensor modules via the at least one input interface; and
at least one output interface that provides at least one video or control signal according to the determined way of presenting the identified information to at least one display device included in the transportation vehicle.

10. The transportation vehicle of claim 9, wherein the plurality of sensor modules includes at least one of a camera, an acoustic sensor, a video sensor, an image sensor, and a motion sensor.

11. A method for a transportation vehicle, the method comprising:
receiving sensor data from a plurality of sensor modules, wherein at least one sensor module for sensing sensor data that indicates a behavior of at least one passenger of the transportation vehicle in an interior of the transportation vehicle by detecting image data or audio data within the interior of the transportation vehicle, and at least one sensor module for sensing sensor data that indicates a driving situation of the transportation vehicle;
determine the behavior of the at least one passenger of the vehicle based on the sensor data collected within the transportation vehicle interior indicating physical movement of the at least one passenger within the transportation vehicle interior;
determine the driving situation of the vehicle based on the sensor data indicating performance of transportation vehicle and an environment condition surrounding the transportation vehicle;
determining a potential information need of the at least one vehicle passenger based on the sensor data received from the plurality of sensor modules via the at least one input interface;
identifying information based on the potential information need;
determining a way of presenting the identified information according to the potential information need in the transportation vehicle based on the sensor data received from the plurality of sensor modules via the at least one input interface; and
providing at least one video or control signal according to the determined way of presenting the identified information to at least one display device included in the transportation vehicle.

12. The method of claim 11, wherein the plurality of sensor modules includes at least one of a camera, an acoustic sensor, a video sensor, an image sensor, and a motion sensor.

13. A non-transitory computer readable medium storing a computer program causing a programmable hardware component to execute a method for a transportation vehicle, the method comprising:
receiving sensor data from a plurality of sensor modules, wherein at least one sensor module for sensing sensor data that indicates a behavior of at least one passenger of the transportation vehicle in an interior of the transportation vehicle by detecting image data or audio data within the interior of the transportation vehicle, and at least one sensor module for sensing sensor data that indicates a driving situation of the transportation vehicle;
determine the behavior of the at least one passenger of the vehicle based on the sensor data collected within the transportation vehicle interior indicating at least one of physical movement, facial expressions, and speech of the at least one passenger within the transportation vehicle interior;
determine the driving situation of the vehicle based on the sensor data indicating performance of transportation vehicle and an environment condition surrounding the transportation vehicle;

determining a potential information need of the at least one vehicle passenger based on the sensor data received from the plurality of sensor modules via the at least one input interface;

identifying information based on the potential information need;

determining a way of presenting the identified information according to the potential information need in the transportation vehicle based on the sensor data received from the plurality of sensor modules via the at least one input interface; and providing at least one video or control signal according to the determined way of presenting the identified information to at least one display device included in the transportation vehicle.

14. The non-transitory computer readable medium of claim 13, wherein the plurality of sensor modules includes at least one of a camera, an acoustic sensor, a video sensor, an image sensor, and a motion sensor.

* * * * *